United States Patent
Shao et al.

(10) Patent No.: US 8,230,211 B2
(45) Date of Patent: Jul. 24, 2012

(54) METHOD FOR SETTING BASIC INPUT/OUTPUT SYSTEM

(75) Inventors: Ming-Yang Shao, Shanghai (CN); Guo-Juan Xin, Shanghai (CN); Yin Deng, Shanghai (CN); Zhong-Ying Ou, Shanghai (CN); Lai Kong, Shanghai (CN); Eric Chiou, Taipei (TW)

(73) Assignee: Inventec Corporation, Taipei (TW)

( * ) Notice: Subject to any disclaimer, the term of this patent is extended or adjusted under 35 U.S.C. 154(b) by 580 days.

(21) Appl. No.: 12/429,540

(22) Filed: Apr. 24, 2009

(65) Prior Publication Data

US 2010/0205422 A1     Aug. 12, 2010

(30) Foreign Application Priority Data

Feb. 12, 2009   (TW) .............................. 98104431 A

(51) Int. Cl.
 G06F 1/24    (2006.01)
 G06F 9/00    (2006.01)
(52) U.S. Cl. ................................ 713/100; 713/1; 713/2
(58) Field of Classification Search .................. 713/1, 2, 713/100
 See application file for complete search history.

(56) References Cited

U.S. PATENT DOCUMENTS

| 6,226,667 | B1 * | 5/2001 | Matthews et al. ............ 709/203 |
| 7,039,799 | B2 * | 5/2006 | Smith et al. .................... 713/100 |
| 7,500,095 | B2 * | 3/2009 | Mahmoud et al. ............... 713/2 |
| 7,908,469 | B2 * | 3/2011 | Yu et al. .............................. 713/1 |
| 8,001,369 | B2 * | 8/2011 | Takeda ................................ 713/2 |
| 2003/0028628 | A1 * | 2/2003 | Irwin et al. ..................... 709/222 |
| 2003/0065915 | A1 * | 4/2003 | Yu et al. ............................... 713/1 |
| 2004/0088534 | A1 * | 5/2004 | Smith et al. ....................... 713/1 |
| 2005/0144432 | A1 * | 6/2005 | Wu ..................................... 713/2 |
| 2005/0177710 | A1 * | 8/2005 | Rothman et al. ................. 713/2 |
| 2006/0020844 | A1 * | 1/2006 | Gibbons et al. .................... 714/2 |
| 2008/0148031 | A1 * | 6/2008 | Brown et al. ....................... 713/1 |
| 2008/0162675 | A1 * | 7/2008 | Bolay et al. ..................... 709/221 |
| 2008/0242362 | A1 * | 10/2008 | Duarte ........................... 455/566 |
| 2008/0256350 | A1 * | 10/2008 | Hattori et al. ..................... 713/1 |
| 2009/0177877 | A1 * | 7/2009 | Holdaway et al. ................ 713/2 |
| 2010/0223454 | A1 * | 9/2010 | Bolay et al. ................... 713/100 |

* cited by examiner

Primary Examiner — Thomas Lee
Assistant Examiner — Jaweed A Abbaszadeh
(74) Attorney, Agent, or Firm — Peter F. Corless; Steven M. Jensen; Edwards Wildman Palmer LLP

(57) ABSTRACT

A BIOS (Basic Input/Output System) setting method is disclosed, which is applicable to a computer equipped with a MEMORY a CMOS RAM (Complementary Metal Oxide Semiconductor Random Access Memory), and a BIOS-ROM (Basic Input/Output System Read-Only Memory) storing a first setting document. The BIOS setting method includes: providing a setting interface to allow a user to perform settings so as to form a second setting document; storing the second setting document in the BIOS-ROM; and loading the first and second setting documents to the MEMORY during a POST (Power On Self Test) process of the computer; saving the first setting document, or alternatively revising the first setting document and/or combining the first setting document with the second setting document according to the second setting document if loaded, so as to form a third setting document; and loading the third setting document to the CMOS RAM to perform a system initialization according to the third setting document.

12 Claims, 5 Drawing Sheets

METHOD FOR SETTING BASIC INPUT/OUTPUT SYSTEM

BACKGROUND OF THE INVENTION

1. Field of the Invention

The present invention relates generally to BIOS setting methods, and more particularly, to a method for setting BIOS and storing settings through a setting interface for a second setting document.

2. Description of Related Art

When a computer is booted, the BIOS (Basic Input/Output System) stored in a ROM thereof checks peripheral devices and then performs initialization. When the BIOS confirms that the peripheral devices are ready, the computer enters the operating system (OS).

FIG. 1 shows the boot process of a computer. In step 100, when powered on, the computer enters a boot state. Then, in step 110, the BIOS installed in a ROM of the computer performs POST (Power On Self Test). Subsequently, in step 120, if a specific key such as a Delete key or F2 key is pressed to enter a BIOS setting interface, the process goes to step 130; otherwise, the process goes to step 160 for continuing the boot process. In step 130, various options are provided in the BIOS setting interface for setting various hardware parameters of the computer, such as the boot sequence, CPU clock, whether to activate peripheral devices, for example, hard disk, floppy disk, built-in network card, time, date and so on. In step 140, after BIOS settings are completed, whether to store the BIOS settings is determined, if not, the previous settings will not be changed and the process goes to step 160 for continuing the boot process; otherwise, the process goes to step 150. In step 150, the BIOS settings are stored in the memory. Thereafter, the process goes to step 160. In step 160, the boot process is continued.

However, since the settings of the options are stored in a RAM of the computer and retained by the battery, as long as there is no need to add or delete hardware or change hardware parameters, it is not necessary to enter the BIOS setting interface for setting the same hardware parameters in future boot processes. The BIOS can set the computer by using the settings stored in the RAM. If the battery is out of power or a checksum error occurs, it will lead to loss of the data stored in the RAM. At this time, the BIOS loads the default value and it becomes necessary to reset all the options. If a setting error occurs or parameters are not correct, the boot process becomes abnormal, which may cause boot failure or hardware failure. As a result, the computer must be rebooted and the BIOS setting process must be repeated again, thereby resulting in considerable inconvenience.

Further, according to the current BIOS setting method, computers of the same configuration must be inconveniently set one by one, thereby resulting in a waste of labor and time.

Therefore, there is a need to provide a BIOS setting method that facilitates BIOS re-settings and meanwhile allows BIOS settings to be performed to computers of the same configuration in a batch mode so as to overcome the above drawback.

SUMMARY OF THE INVENTION

According to the above drawback, the present invention provides a BIOS setting method, makes the BIOS settings first so as to reboot the computer according to the data.

Another object of the present invention is to provide a BIOS setting method that can perform BIOS settings to computers of the same configuration in a batch mode so as to avoid the inconvenience to perform BIOS settings to the computers one by one.

In order to achieve the above and other objects, the present invention provides a BIOS setting method applicable to a computer with MEMERY, COMS RAM and BIOS-ROM that having a first setting document. The method comprises the steps of: (1) providing a BIOS-ROM for storing the first setting document; (2) defining a block in the BIOS-ROM for storing a second setting document; (3) during a Power On Self Test (POST) process, loading both the first setting document and the second setting document stored in the BIOS-ROM to a MEMORY; (4) revising the first setting document according to the second setting document, if loaded and/or combining the first setting document with the second setting document so as to form a third setting document; (5) loading the third setting document to a CMOS RAM; and (6) reading the third setting document and initializing the system according to the third setting document.

According to the above-mentioned BIOS setting method, the second setting document is formed by the steps of: after the computer booting up and entering an operating system, providing a setting interface in the operating system for user's settings; receiving and saving the user's settings so as to form the second setting document, and storing the second setting document in the BIOS-ROM and/or the external storage.

According to another embodiment, the second setting document further comprises a tag that can be selectable by a user, which the tag denotes whether to use the second setting document.

The BIOS setting method according to the present embodiment further comprises: during the POST process, determining whether to use the second setting document according to the tag; if yes, steps (3) to (6) are performed; otherwise, only the first setting document stored in the BIOS-ROM is loaded to the MEMORY and then loading the first setting document to the CMOS RAM, and reading the first setting document for initializing the system according to the first setting document.

According to the above-mentioned embodiments, the setting interface for user's setting of the second setting document is similar with the BIOS setting interface. The second setting document can be stored as a binary document.

According to the BIOS setting method of the present invention, customized BIOS settings are inputted through a second setting document setting interface and stored in the BIOS-ROM such that when the computer is rebooted, the customized BIOS settings of the BIOS-ROM can be read. Thus, no matter whether the battery of the computer is out of power or whether a checksum error occurs to the RAM of the computer, the BIOS settings will not lose. Meanwhile, BIOS settings to computers of the same configuration can be performed in a batch mode according to the settings, thereby avoiding the inconvenience to perform BIOS settings to the computers one by one and facilitating the mass production thereof.

DETAILED DESCRIPTION OF PREFERRED EMBODIMENTS

The following illustrative embodiments are provided to illustrate the disclosure of the present invention, these and other advantages and effects can be apparent to those ordinarily skilled in the art after reading the disclosure of this specification.

First Embodiment

Figure 1:
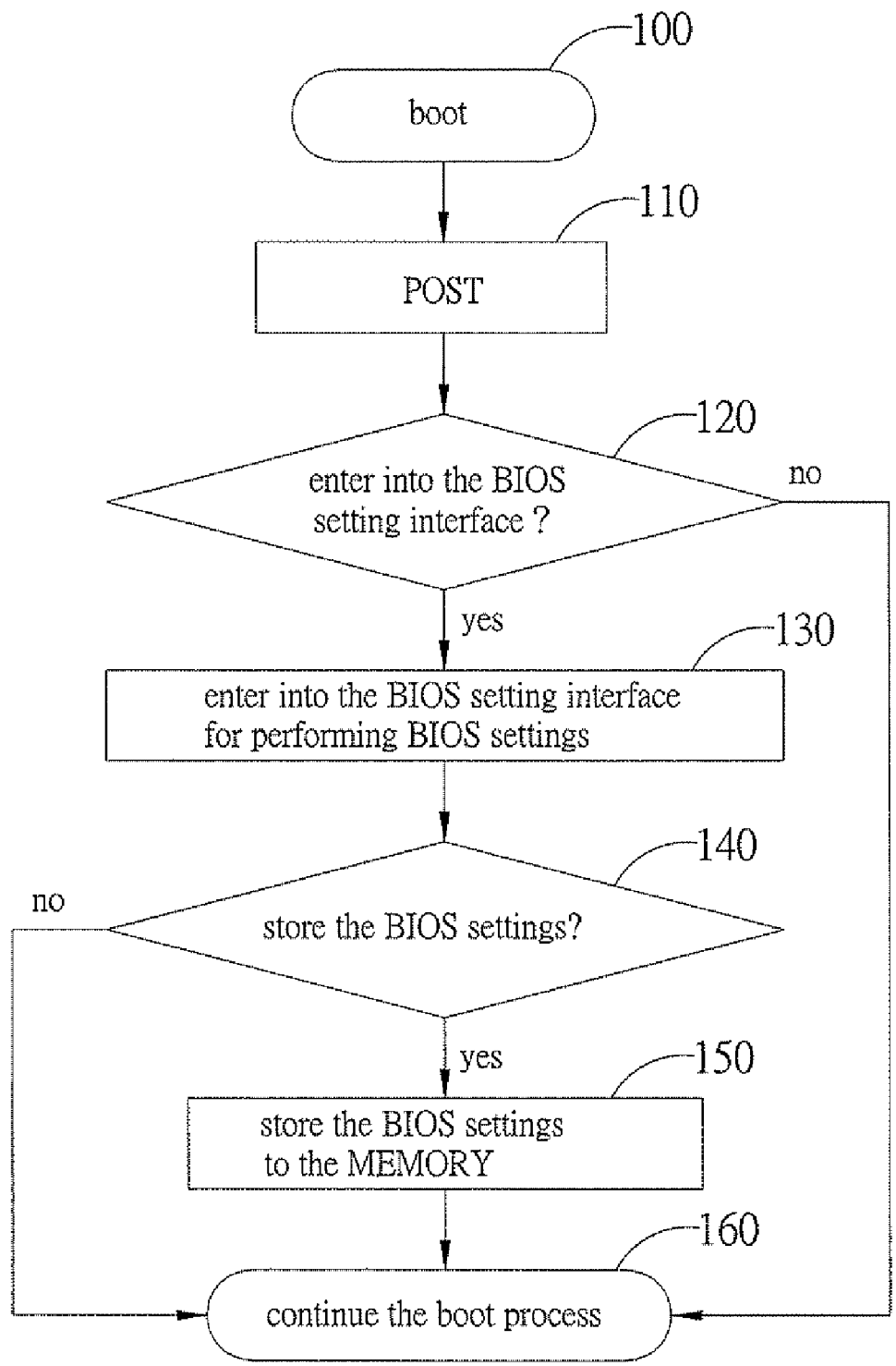
FIG. 1 is a flow diagram showing a BIOS setting process when the computer is booted.
Figure 2A:
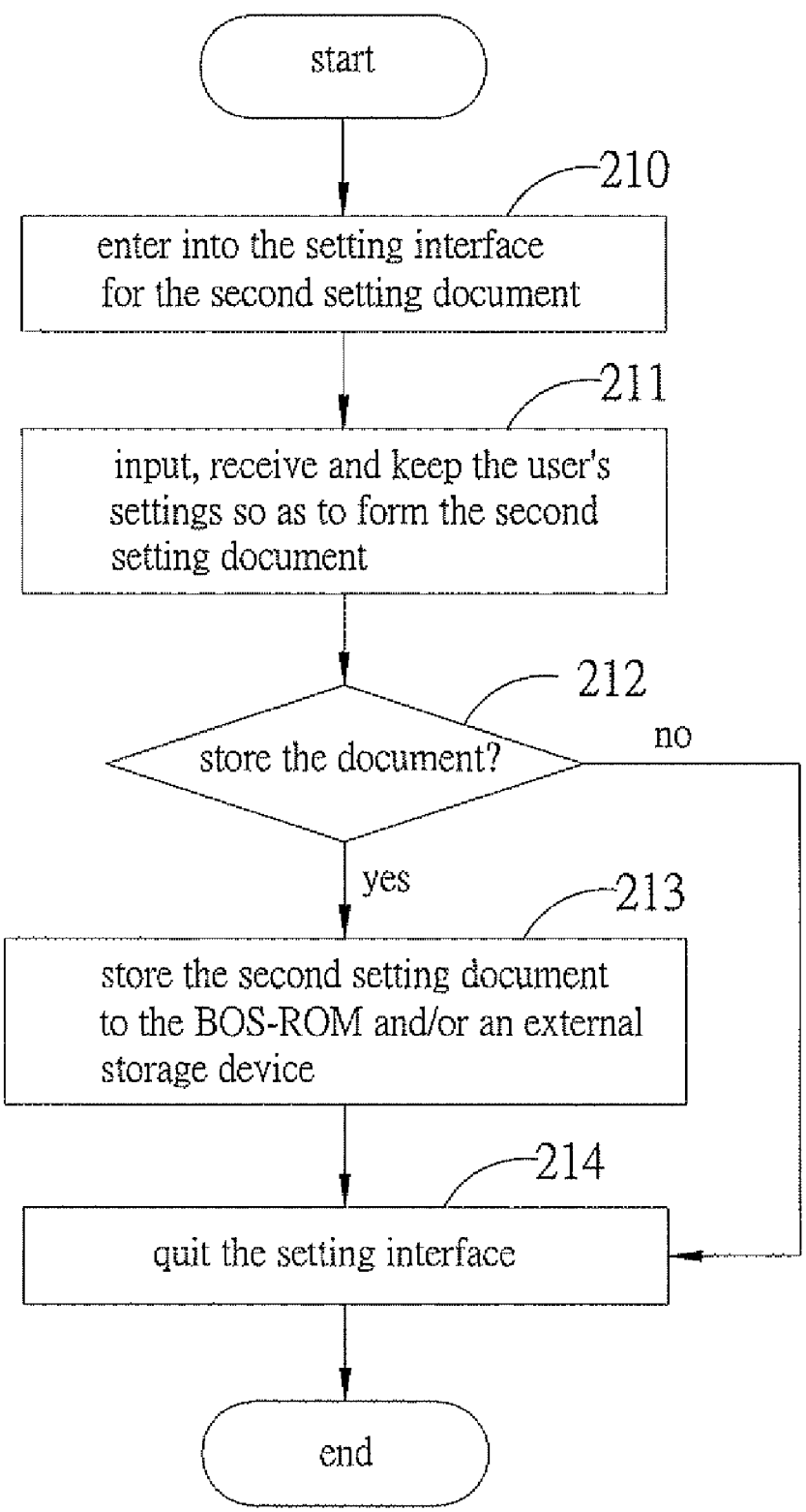
FIG. 2A is a flow diagram showing a process for forming a second setting document according to a first embodiment of the present invention.
Figure 2B:
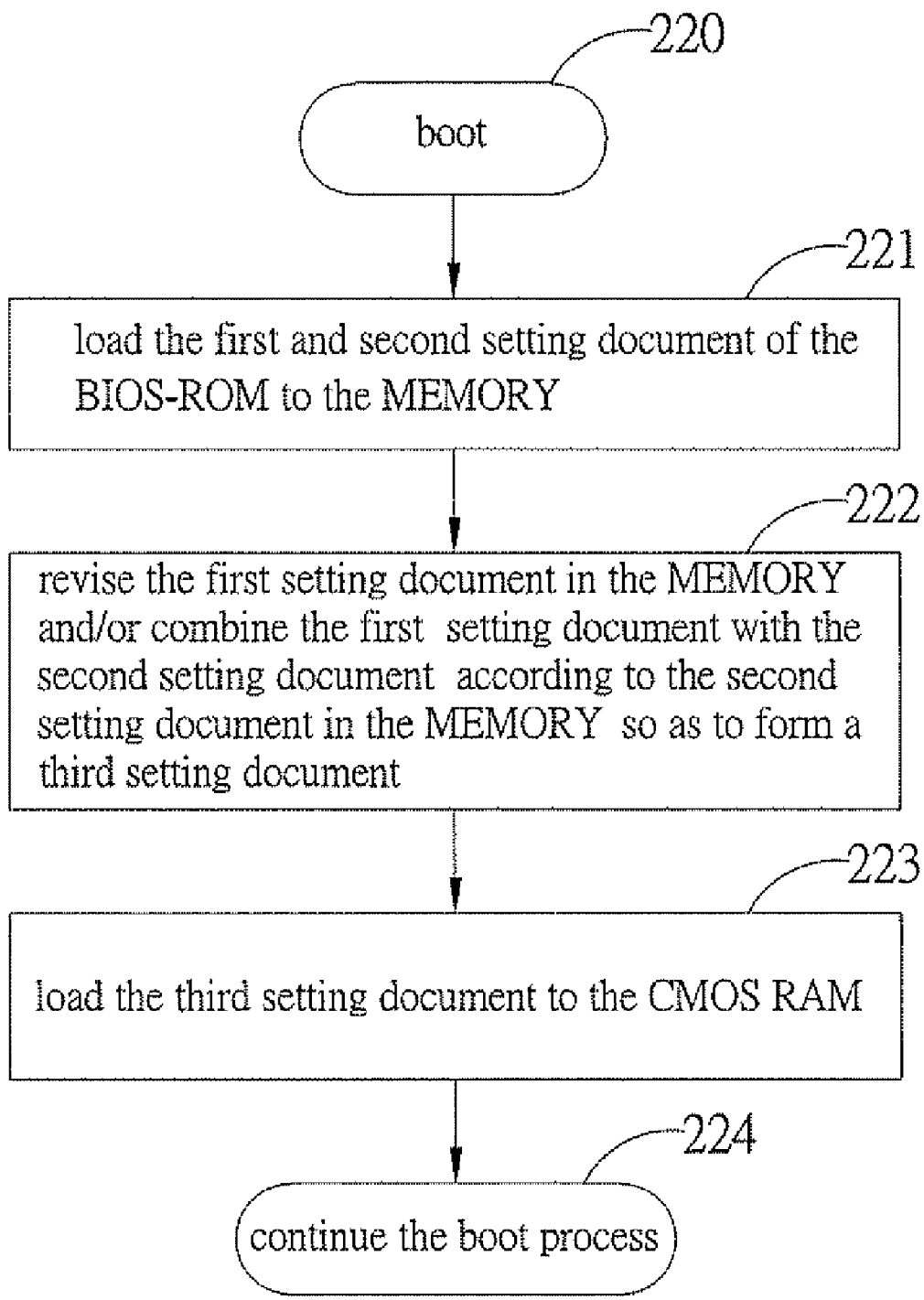
FIG. 2B is a flow diagram showing a BIOS setting method according to a first embodiment of the present invention.

FIGS. 2A and 2B show a process for forming a second setting document and a Basic Input/Output System (BIOS) setting method according to a first embodiment of the present invention. The BIOS setting method is applied to a computer having a MEMORY, a CMOS RAM and a BIOS-ROM, wherein the BIOS-ROM stores a first setting document, i.e., default BIOS settings, and further, a block is defined in the BIOS-ROM for storing a second setting document. In the operating system, a second setting document setting interface is provided to allow a user to perform settings as well as receive and save the user's settings so as to form the second setting document, i.e., customized BIOS settings and the second setting document are stored in the BIOS-ROM. When the computer is rebooted, during the POST process, the BIOS loads the first setting document and the second setting document from the BIOS-ROM to the MEMORY. Then, the first setting document is revised and/or combined with the second setting document according to the second setting document, so as to form a third setting document. The third setting document is further loaded to the CMOS RAM, and the system is initialized according to the third setting document.

As shown in FIG. 2A, a setting interface is provided for forming a second setting document. First, in step 210, after the computer boots up and enters the operating system, the computer enters the setting interface for a second setting document so as to allow a user to perform settings, wherein the setting interface is similar to a BIOS setting screen. Then, in step 211, the setting interface provides the user's settings, received and stored so as to form the second setting document. Subsequently, in step 212, whether to store the second setting document is determined, if not, the process goes to step 214 so as to quit the setting interface; otherwise, the process goes to step 213. In step 213, the second setting document is stored in the BIOS-ROM and/or an external storage device. Alternatively, the second setting document is first stored in the external storage device and then according to the practical need, the second setting document is written to the BIOS-ROM through a BIOS writing or update tool. The external storage device can be, but not limited to, a hard disk, a CD-ROM, or a flash memory. The second setting document can be stored as a binary document. After storage, step 214 quitting the setting interface is performed. Therein the second setting document is written to the BIOS-ROM by using a BIOS writing or update tool. For example, a BIOS writing tool is used to read the binary document stored in a hard disk and write the binary document to the BIOS-ROM, and then the computer is rebooted so as to complete the writing process of the second setting document. Also, for example, a BIOS update tool is used to read the binary document stored in a CD-ROM and update the second setting document in the BIOS-ROM, and then the computer is rebooted to complete the update process of the second setting document in the BIOS-ROM.

As shown in FIG. 2B, a BIOS setting method is proposed according to an embodiment of the present invention. The BIOS-ROM of the computer stores the second setting document. In step 220, the computer enters a POST process. Then, in step 221, both the first setting document and the second setting document in the BIOS-ROM are loaded to the MEMORY. Subsequently, in step 222, the first setting document in the MEMORY is revised, and/or combined with the second setting document according to the second setting document so as to form a third setting document. Thereafter, in step 223, the third setting document is loaded to the CMOS RAM. Finally, in step 224, the boot process is performed according to the third setting document. Therefore, in accordance with the BIOS setting method of the present invention, after the computer boot has been performed, customized BIOS settings are completed. As a result, when the computer is rebooted, the computer automatically loads the customized BIOS settings such that the boot process is performed according to the new BIOS settings.

Second Embodiment

Figure 3A:
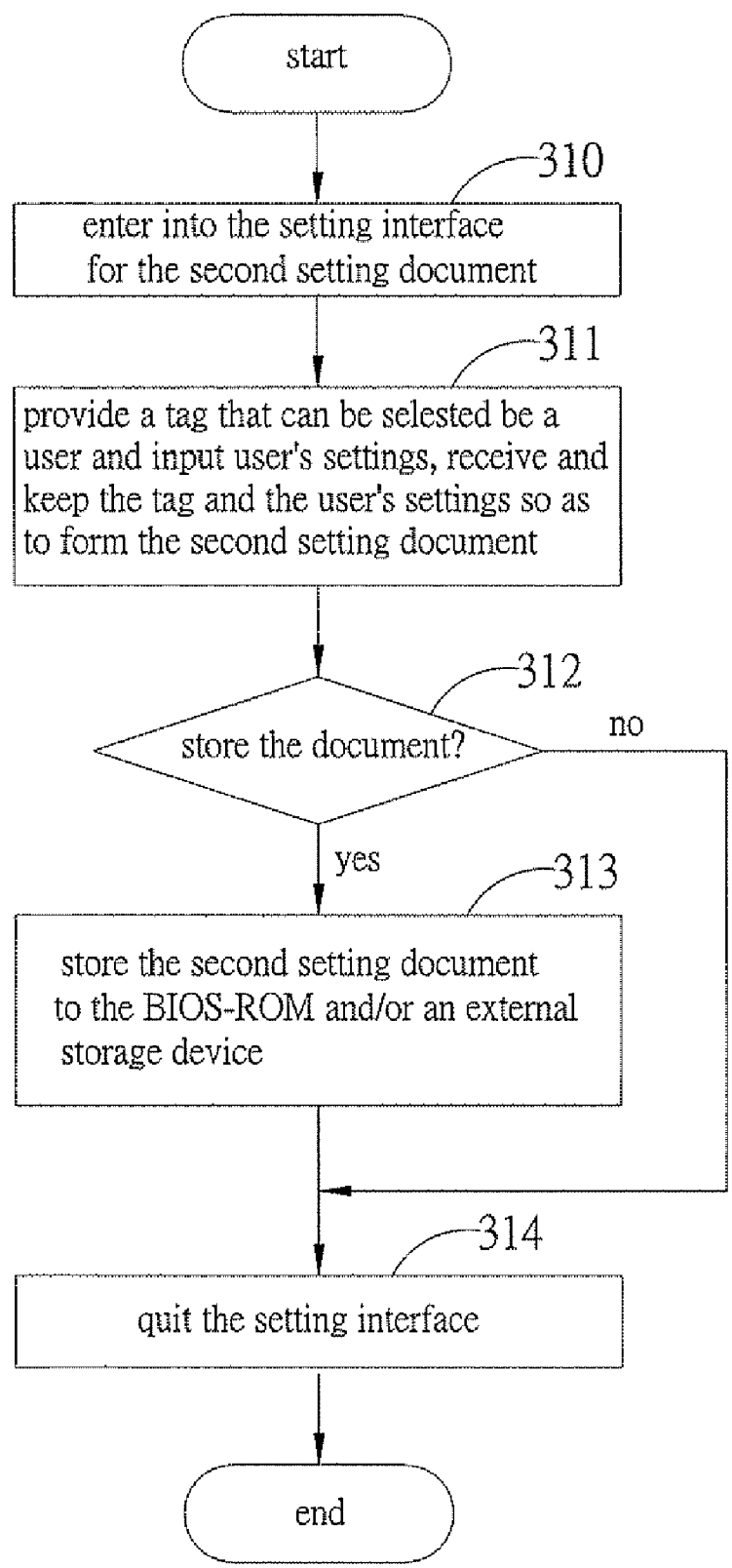
FIG. 3A is a flow diagram showing a process for forming a second setting document according to a second embodiment of the present invention.
Figure 3B:
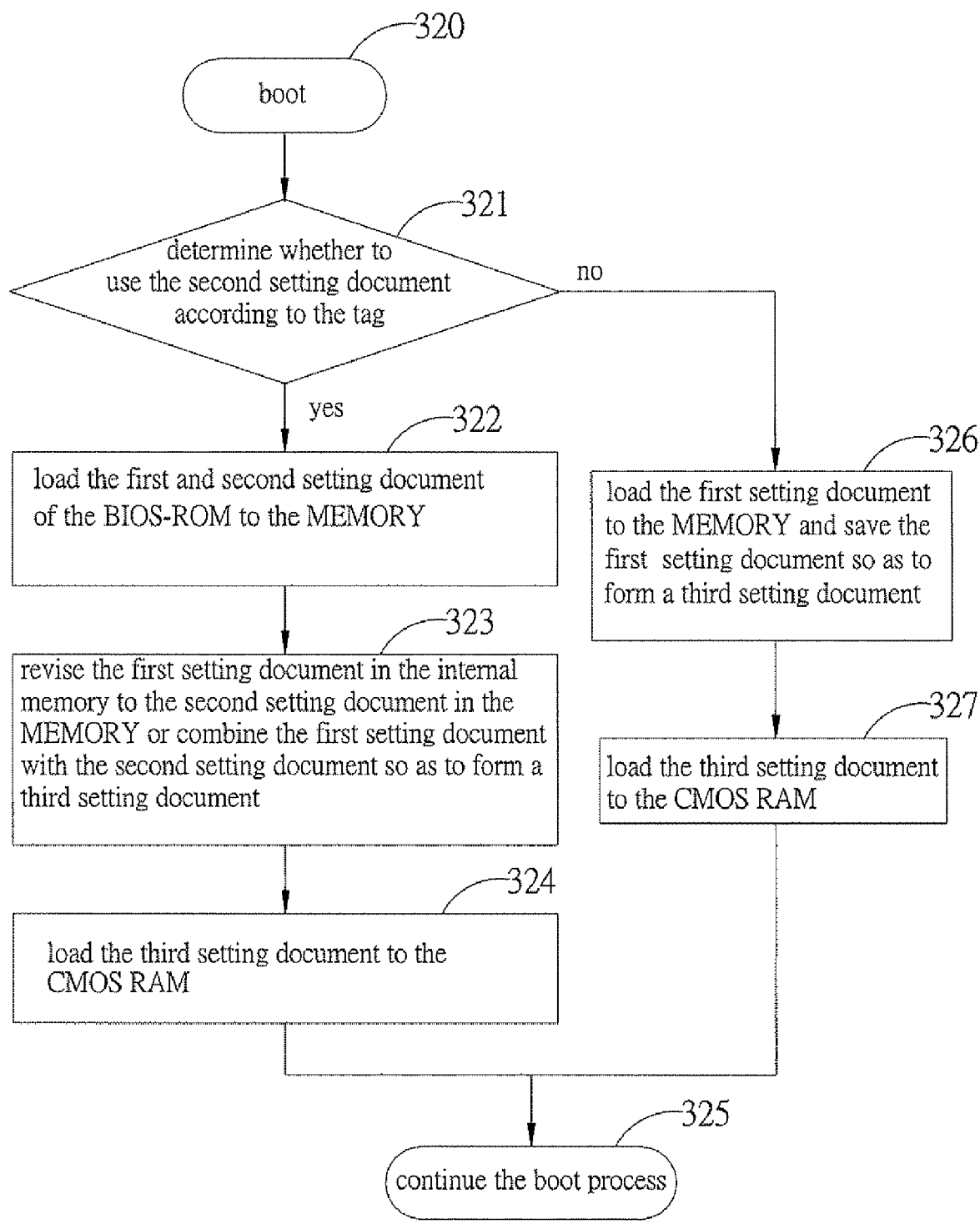
FIG. 3B is a flow diagram showing a BIOS setting method according to a second embodiment of the present invention.

FIGS. 5A and 3B show a process for forming a second setting document and a BIOS setting method according to the second embodiment of the present invention. Different from the first embodiment, the present embodiment forms a tag during forming the second setting document for denoting whether to use the second setting document.

As shown in FIG. 3A, a setting interface is provided for forming a second setting document.

In step 310, when booted, the computer enters the setting interface that presents common setting options in a tabular form, for example, the boot sequence, whether to activate a floppy driver or a network card and so on. In step 311, a user selection tag and the user's settings are provided. The user's settings and the tag are received and stored so as to form the second setting document, wherein the tag is used to denote whether to use the second setting document. Then, in step 312, whether to store the second setting document is determined, if not, the process goes to step 314 so as to quit the setting interface; otherwise, the process goes to step 313. In step 313, the second setting document is stored in the BIOS-ROM and/or an external storage device. After storage, step 314 of quitting the setting interface is performed.

As shown in FIG. 3B, in step 320, the computer is booted. Then, the process goes to step 321. In step 321, during the POST process, whether to use the second setting document is determined by the tag. If not, the process goes to step 326. In step 326, the first setting document is loaded to the MEMORY. Then, the process goes to step 327. In step 327, the first setting document is loaded to the CMOS RAM. Then, the process goes to step 325. In step 325, the boot process is continued. On the other hand, if the second setting document is determined to be used in step 321, the process goes to step 322. In step 322, the first and the second setting documents in the BIOS-ROM are loaded to the MEMORY. Then, the process goes to step 323. In step 323, the first setting document in the MEMORY is revised and/or combined with the second setting document in the MEMORY according to the second setting document so as to form a third setting document. Then, the process goes to step 324. In step 324, the third setting document is loaded to the CMOS RAM. Then, the process goes to step 325. In step 325, the boot process is performed according to the third setting document.

The BIOS setting method of the present invention forms customized BIOS settings through a setting interface and loads the customized BIOS settings to the BIOS-ROM such that when the computer is rebooted, the BIOS reads the customized BIOS settings from the BIOS-ROM and completes the boot process according to the customized BIOS settings and default BIOS settings. Therefore, after the computer boot, parameter settings are performed through a setting interface so as to obtain a binary document comprising the customized BIOS settings. Based on the binary document, BIOS settings can be performed to computers of the same type in a batch mode, thereby improving the convenience for users.

The above-described descriptions of the detailed embodiments are only to illustrate the preferred implementation according to the present invention, and it is not to limit the scope of the present invention, Accordingly, all modifications and variations completed by those with ordinary skill in the art should fall within the scope of present invention defined by the appended claims.

What is claimed is:

1. A Basic Input/Output System (BIOS) setting method applicable to a computer having a first setting document, the method comprising the steps of:
   (1) providing a BIOS-ROM for storing the first setting document;
   (2) defining a block in the BIOS-ROM for storing a second setting document;
   (3) during a Power On Self Test (POST) process, loading both the first setting document and the second setting document stored in the BIOS-ROM to a MEMORY;
   (4) revising the first setting document according to the second setting document if loaded, and/or combining the first setting document with the second setting document, so as to form a third setting document;
   (5) loading the third setting document to a CMOS RAM; and
   (6) reading the third setting document so as to perform a system initialization according to the third setting document,
   wherein the second setting document is formed by the steps of:
   providing a setting interface in an operating system for user's settings; and
   receiving and saving the user's settings so as to form the second setting document.

2. The method of claim 1, wherein the setting interface for forming the second setting document presents common setting options in a tabular form.

3. The method of claim 1, wherein the second setting document comprises a tag for user's selection for denoting whether to use the second setting document to form the third setting document.

4. The method of claim 3, further comprising during the POST process, determining whether to use the second setting document according to the tag; if yes, performing steps (3) to (6), otherwise, loading only the first setting document stored in the BIOS-ROM to the MEMORY and loading the first setting document to the CMOS RAM, and reading the first setting document for performing the system initialization according to the read first setting document.

5. The method of claim 1, further comprising a step of writing/updating and then storing the second setting document in the BIOS-ROM.

6. The method of claim 5, wherein the second setting document is written or updated by a BIOS writing/updating tool to the BIOS-ROM.

7. The method of claim 1, wherein the second setting document comprises a binary document.

8. A Basic Input/Output System (BIOS) setting method applicable to a computer having a first setting document, the method comprising the steps of:
   (1) providing a BIOS-ROM for storing the first setting document;
   (2) defining a block in the BIOS-ROM for storing a second setting document;
   (3) during a Power On Self Test (POST) process, loading both the first setting document and the second setting document stored in the BIOS-ROM to a MEMORY;
   (4) revising the first setting document according to the second setting document if loaded, and/or combining the first setting document with the second setting document, so as to form a third setting document;
   (5) loading the third setting document to a CMOS RAM; and
   (6) reading the third setting document so as to perform a system initialization according to the third setting document,
   wherein the second setting document comprises a tag for user's selection for denoting whether to use the second setting document to form the third setting document.

9. The method of claim 8, further comprising a step of writing/updating and then storing the second setting document in the BIOS-ROM, wherein the second setting document is written or updated by a BIOS writing/updating tool to the BIOS-ROM.

10. A Basic Input/Output System (BIOS) setting method applicable to a computer having a first setting document, the method comprising the steps of:
    providing a BIOS-ROM for storing the first setting document;
    defining a block in the BIOS-ROM for storing a second setting document;
    during a Power On Self Test (POST) process, loading both the first setting document and the second setting document stored in the BIOS-ROM to a MEMORY;
    revising the first setting document according to the second setting document if loaded, and/or combining the first setting document with the second setting document, so as to form a third setting document;
    loading the third setting document to a CMOS RAM;
    reading the third setting document so as to perform a system initialization according to the third setting document; and
    writing/updating and then storing the second setting document in the BIOS-ROM.

11. The method of claim 10, wherein the second setting document is written or updated by a BIOS writing/updating tool to the BIOS-ROM.

12. A Basic Input/Output System (BIOS) setting method applicable to a computer having a first setting document, the method comprising the steps of:
    providing a BIOS-ROM for storing the first setting document;
    defining a block in the BIOS-ROM for storing a second setting document;
    during a Power On Self Test (POST) process, loading both the first setting document and the second setting document stored in the BIOS-ROM to a MEMORY;
    revising the first setting document according to the second setting document if loaded, and/or combining the first setting document with the second setting document, so as to form a third setting document;
    loading the third setting document to a CMOS RAM; and
    reading the third setting document so as to perform a system initialization according to the third setting document,
    wherein the second setting document comprises a binary document.

* * * * *